United States Patent
Youngs et al.

(10) Patent No.: US 8,063,368 B1
(45) Date of Patent: Nov. 22, 2011

(54) IMAGING ARRANGEMENT

(75) Inventors: Eric Geoffrey Dunlop Youngs, Purleigh (GB); Raymond Samuel Cox, Chelmsford (GB); Kevin Daryl Blackmore, Westcliff-on-Sea (GB)

(73) Assignee: Selex Sensors and Airborne Systems Limited, Basildon, Essex (GB)

( * ) Notice: Subject to any disclaimer, the term of this patent is extended or adjusted under 35 U.S.C. 154(b) by 0 days.

(21) Appl. No.: 07/018,568

(22) Filed: Feb. 2, 1987

(30) Foreign Application Priority Data

Feb. 1, 1986 (GB) ...................... 8602503

(51) Int. Cl.
*G02B 26/10* (2006.01)
(52) U.S. Cl. .......................... 250/334; 356/4
(58) Field of Classification Search ................. 250/334, 250/330; 356/4, 4.5, 28.5
See application file for complete search history.

(56) References Cited

U.S. PATENT DOCUMENTS

| | | | |
|---|---|---|---|
| 3,287,559 A * | 11/1966 | Barnes | .......................... 250/334 |
| 3,811,774 A | 5/1974 | Honeycutt et al. | |
| 3,832,056 A | 8/1974 | Shipp et al. | |
| 3,953,667 A | 4/1976 | Layton et al. | |
| 4,298,280 A * | 11/1981 | Harney | ...................... 250/334 X |
| 4,300,160 A * | 11/1981 | Pusch et al. | ................ 250/334 X |
| 4,323,776 A * | 4/1982 | Bridges et al. | ............. 250/334 X |
| 4,520,504 A * | 5/1985 | Walker et al. | .............. 250/330 X |
| 4,561,775 A * | 12/1985 | Patrick et al. | .............. 250/334 X |
| 4,574,197 A * | 3/1986 | Kliever | .......................... 250/334 |
| 4,639,140 A * | 1/1987 | Lerat | ................................. 356/4 |
| 4,666,295 A * | 5/1987 | Duvall, III et al. | ....... 356/28.5 X |
| 4,674,826 A * | 6/1987 | Loy | ............................ 250/334 X |
| 4,682,222 A * | 7/1987 | Smith et al. | ............... 250/334 X |

FOREIGN PATENT DOCUMENTS

| | | |
|---|---|---|
| EP | 0164181 | 12/1985 |
| GB | 2095069 | 9/1982 |

* cited by examiner

*Primary Examiner* — Mark Hellner
(74) *Attorney, Agent, or Firm* — Crowell & Moring LLP

(57) ABSTRACT

An imaging arrangement combines a thermal imager with a laser imager to enable several correlated pictures to be produced which show different properties of the same field of view. A common scanning device is used to scan each pixel in the field of view in a raster-like pattern, and for each pixel data can be derived representing thermal content, range, optical reflectivity and velocity. The last three properties are obtained by coupling an optical interferometer to the scanning device which generates the picture representing the thermal content.

9 Claims, 3 Drawing Sheets

IMAGING ARRANGEMENT

BACKGROUND OF THE INVENTION

This invention relates to an imaging arrangement. It is well known to produce two-dimensional images of a viewed scene, for example by means of a television camera or the like. Conventional viewing systems of this kind tend to be restricted as to the optical bandwidth to which they are sensitive, and in particular they are generally insensitive to infrared (thermal) radiation. Various kinds of thermal imaging systems are well known, and include specially adapted television-like cameras having a shutter in front of a heat sensitive image surface which responds to the changes in temperature, resulting from shutter action. An alternative kind of thermal imaging system of higher resolution involves the use of a scanning arrangement which causes each part of a scene to be viewed in turn by a small very sensitive sensor or array of sensors. It is, however, difficult to correlate such a thermal image of a scene with its optical equivalent, in which the optical images result from light reflected by the viewed scene. Such correlation can be important if it is desired to extract data relating to various characteristics of an object in the viewed scene so as to identify it or determine the nature of its movement.

The present invention seeks to provide an improved imaging arrangement.

SUMMARY OF THE INVENTION

According to this invention an imaging arrangement includes a scanning device for sequentially viewing different elements of a scene; thermal sensing means coupled to said scanning device for forming a two-dimensional image of scene-emitted thermal radiation; an optical source for illuminating the scene via the scanning device; and optical sensing means coupled to said scanning device for extracting data from the light reflected by the scene in response to the illumination by said optical source.

The scanning device is preferably one which includes a continuously rotatable polygon faced mirror in combination with a steppable inclined mirror. Conventionally, such a scanning device can be regarded as forming a scanning pattern which is analogous to a television-like raster in which adjacent facets of the polygon faced mirror produce sequential line scans, and the action of the steppable inclined mirror produces movement in the perpendicular frame direction so that sequential line scans are displaced laterally from one another so as to in time scan the whole of a two-dimensional field of view.

Preferably the light source is a laser operative to produce a narrow beam of coherent light which is incident upon the rotatable polygon faced mirror and the steppable mirror so as to scan the scene in a two-dimensional raster pattern.

The reflected laser light which is returned from the scene is separated from the emitted thermal radiation by means of a narrow band filter. In this way the effect of ambient illumination of the scene by other sources of light, including daylight, can be removed if desired. The use of laser light to illuminate the scene in a scanned fashion enables various kinds of data to be obtained for the individual pixels in the scene: for example, the range and line-of-sight velocity for objects in the scene. This data can be correlated with a conventional image derived from reflected light representing tone values to assist in the identification of moving objects, and all of the optical data can be directly correlated with the infrared data as it is obtained via the common scanning device. Furthermore, since the optical part of system makes use of the scanning device, the overall arrangement can be compact, and permits the optical data to be considered on a pixel-by-pixel basis which is made possible by the use of the two-dimensional scanning raster pattern.

The invention is further described below by way of example, with reference to the drawings.

DETAILED DESCRIPTION OF THE PREFERRED EMBODIMENT

Figure 1:
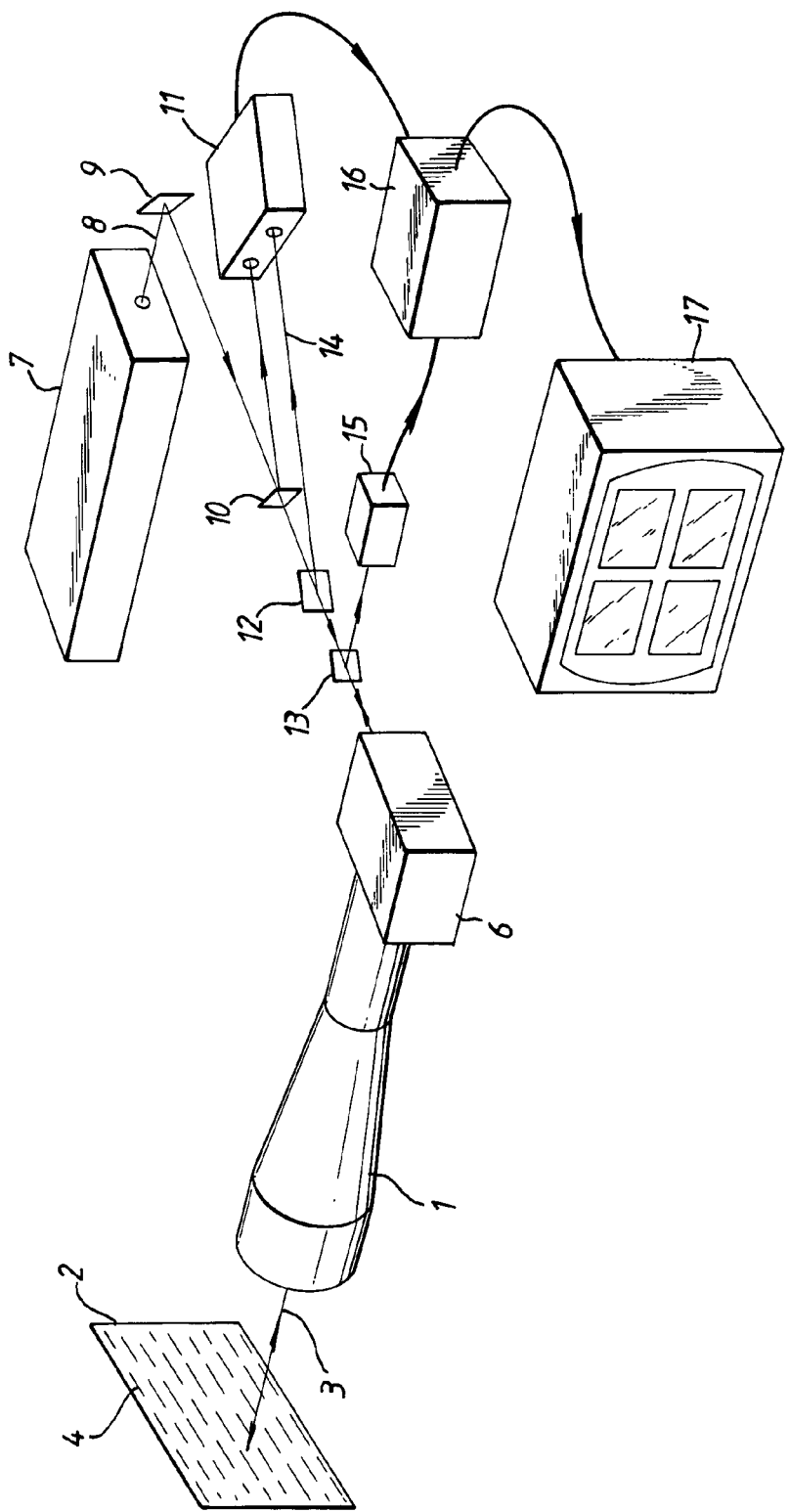
FIG. 1 shows the whole imaging arrangement in a schematic fashion.

Referring to FIG. 1 there is shown therein a telescope 1 by means of which light from the imaging arrangement can be directed upon a field of view. This field of view 2 is represented very diagramatically by the rectangle and the beam of light 3 is arranged to scan across each point in this field of view systematically in a television-like raster pattern consisting of a number of parallel line scans 4. Because of the nature of the scanner 6 which generates this pattern, the time intervals between adjacent line scans are extremely short. The light used to scan the scene is a very narrow laser beam consisting essentially of monochromatic light, having a very small frequency modulation bandwidth superimposed thereon.

The scanner 6 is operative in a known manner in order to trace out the raster pattern 4, and its details will be described subsequently with reference to FIG. 2. The laser beam originates with a laser source 7 which produces a narrow output beam 8 which is reflected by a mirror 9 on to a beam splitter 10. The purpose of the beam splitter 10 is to pass the majority of the laser light to the scanner 6, and to reflect a very small portion to an interferometer 11 so that a reference beam is available for comparison with light reflected by the field of view 2 so as to permit the determination of the line of sight velocity and range of the objects which reflect the light. Most of the light is passed by the beam splitter 10 to the scanner 6 via a light separator 12 and a dichroic beam splitter 13. Briefly, the function of the beam separator 12 is to permit a path of light through it from the beam splitter 10 in the direction of the scanner 6 but to ensure that light travelling in the reverse direction from the field of view 2 is directed wholly along path 14 to the interferometer 11. The purpose of the dichroic beam splitter 13 is to pass all of the incident laser light to the scanner but to separate out the reflected laser light from the radiation entering the telescope 1 from the scene 4 so that the laser light is passed to the interferometer 11 whilst the remaining light including the thermal infra-red content is passed to the thermal detector 15.

The components so far described are operative to determine various characteristics of the field of view 4 in dependence on their interaction with the laser light, and the reflected laser light can be used by the interferometer 11 to determine range and velocity. Additionally, the intensity of the reflected laser light can be used to form a tone value appraisal of the scene in conventional fashion. However, the imaging arrangement also includes the thermal detector 15 which receives infrared radiation emitted by the field of view 4. As mentioned above, the dichroic beam splitter 13 is operative to reflect all of the light incident upon the telescope to the thermal detector 15 with the exception of the very narrow band of laser light which is diverted by the dichroic beam splitter 13 to the interferometer 11. The dichroic beam splitter 13 is a partially reflective, partially transmitting device having a very narrow bandwidth for the transmitted portion.

The outputs of the interferometer 11 and the thermal detector 15 are passed to a signal processing unit 16 which correlates the various elements of information which are derived from the field of view 4 and generates four separate television-like pictures on a display 17, the four pictures representing respectively the thermal content of the scene, the visual content of the scene in terms of the laser reflection, the range of objects within the scene, and the line-of-sight velocity of moving objects within the scene. These four pictures represent the same field of view area and permit easy correlation with the various characteristics. For example, variations in range can be represented by different colours or different shades of a monochrome picture.

Because of the nature of the thermal detector 15 it is necessary to image each point of the field of view upon it in turn in a sequential fashion, it being impracticable to produce very large thermal detectors which can produce an output representative of the whole field of view at any one instant, as can a conventional television camera for example. Furthermore, since sensitive thermal detectors respond to changes in temperature rather than to absolute temperature values, it is necessary to produce some sort of shuttering effect and this is inherently provided by the scanner 6 as it focusses sequential image points upon the thermal detector 15. The presence of the scanner 6 permits the narrow laser beam to also be imaged upon each pixel within the field of view in turn in order to derive information concerning the range and velocity of individual objects located within the scene. It is clearly not necessary to use a sequential optical scanner in order to obtain information relating to the reflectivity of the scene of view but nevertheless, this is the most convenient way of achieving this function given the presence of the scanner 6 and the very narrow cross-sectional area of the laser beam, and it enables reflectivity to be correlated with the other characteristics.

Figure 2:
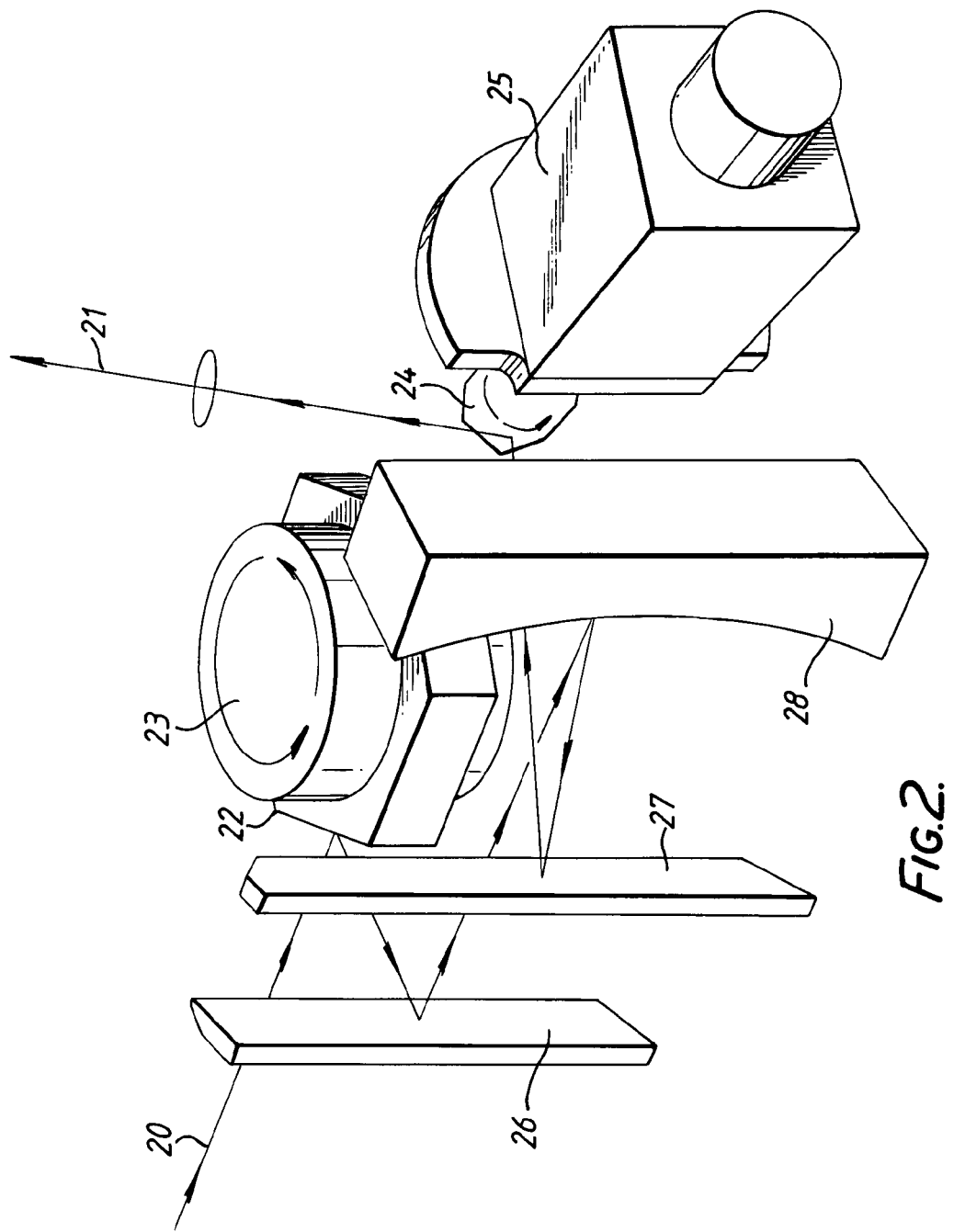
FIG. 2 shows the scanner in more detail.

Referring to FIG. 2, the scanner 6 is shown therein in more detail. The light path from the telescope 1 is represented by the line 20, and the light path to the dichroic beam splitter 13 is represented by the line 21. The outgoing and return light paths are in fact coincident. The scanner 6 consists primarily of two mirrors, one which is a polygon faced mirror 22 which is continually rotated about a vertical axis by an electric motor 23. Light 20 from the telescope is reflected off one of the flat faces of the mirror 22 on to a frame mirror 24 which is driven by a frame motor 25. The function of the frame mirror 25 is to step down the field of view from one television-like line scan to the next whilst the polygon mirror 22 smoothly scans along each of the lines of the television-like raster pattern within the field of view. Although the polygon mirror 25 rotates continuously and smoothly in a constant direction, the frame mirror 24 is a stepping mirror which is stepped round in discrete steps by the frame motor 25 at the end of each line scan of the raster pattern. Additional intermediate mirrors 26, 27 and 28 are provided between the polygon mirror 22 and the frame mirror 24 in order to maintain the optical purity of the image as the image would otherwise be distorted by the effect of the rotations of the two mirrors and the angular offsets of the input and output paths. Optical scanners of this general kind are in themselves known and are conventionally used with small high quality dedicated thermal detectors.

Figure 3:
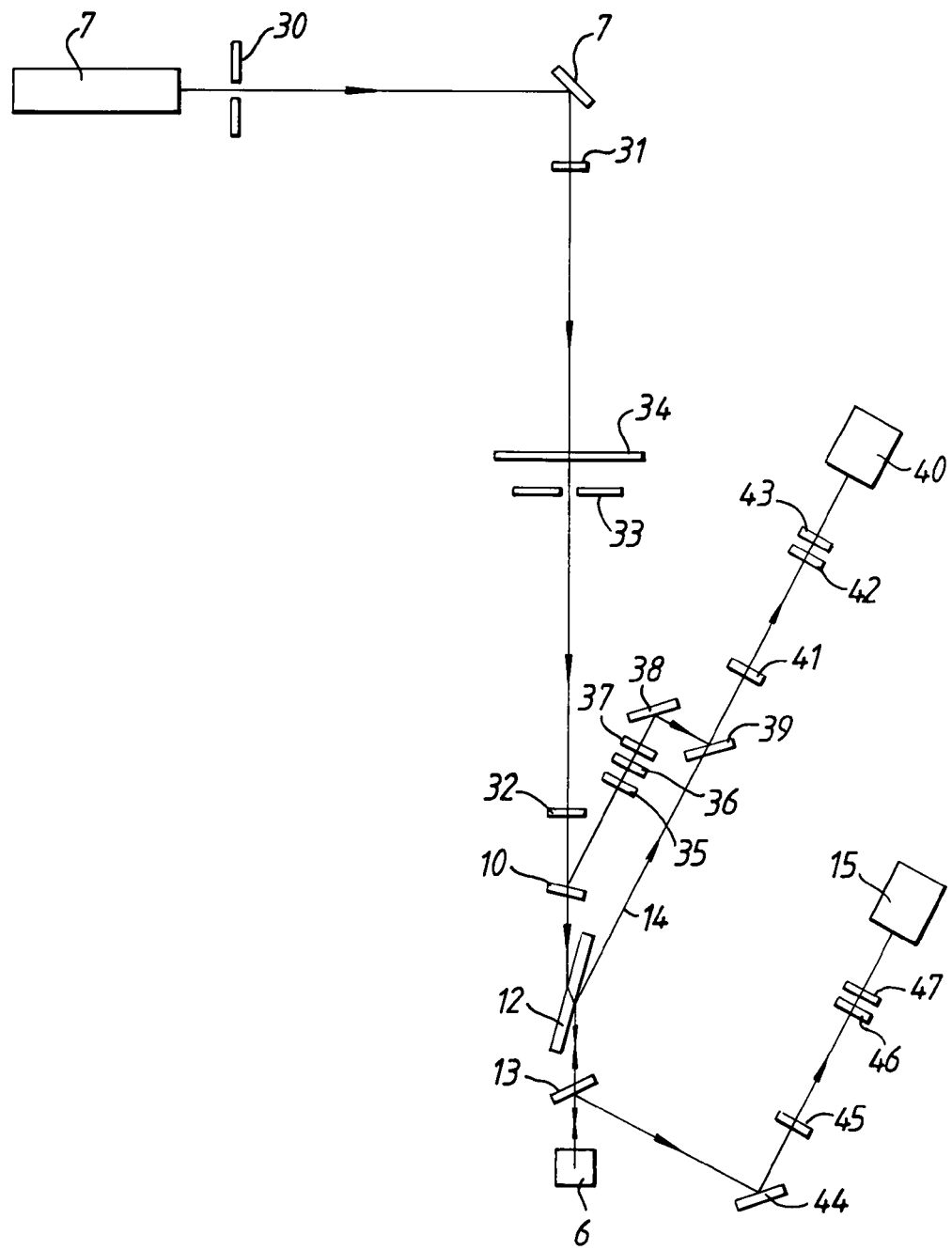
FIG. 3 shows the internal optical paths associated with the imaging arrangement.

A more detailed illustration of the optical arrangement of the imaging device is shown in FIG. 3 in which so far as possible like reference numerals are used as in the previous drawings.

The laser 7 generates a narrow band of monochromatic light, the beam of which is defined by the size of an exit pupil 30. The frequency of the light is modulated in a sinusoidal manner to a frequency amplitude deviation of about 40 MHz (which is negligible so far as the nominal frequency of the light is concerned) and at a modulation repetition frequency of about 30 kHz. This frequency of 30 kHz is chosen to be equal to the pixel size or resolution, of the line scans within which the field of view is scanned. The narrow beam is reflected at the mirror 9 via a plano-convex lens 31 which, in combination with a further similar lens 32, represents the beam forming optics for the laser beam. The lens 31 and 32 are separated by the sum of their focal lengths. At the image formed between them, there is positioned a spatial filter 33 consisting of a small circular hole which serves to define clean edges to the effective source 7 and it also acts to prevent reflections from the rest of the system getting back into the laser cavity, as if this happens, the frequency stability of the laser 7 can be adversely effected. Positioned closely adjacent to the spatial filter 33 is a rotating chopper disc 34 which has two functions. Firstly, it acts to prevent a full power reflection of the laser from the scanner 6 during the blanking period. As the scanner contains a rotating polygon mirror 22, each facet of this polygon becomes perpendicular to the optical axis at one moment whilst it is in the outgoing laser beam. Secondly, the chopper disc acts to prevent any laser power being emitted during the blanking period so that the thermal detector 15 can see a true cold reference for the clamping of its output waveform.

Part of the laser beam which is incident upon the beam splitter 10 is directed into the interferometer 11. The interferometer itself consists of two arms, one of which receives the light from the splitter 10 and consists of a half wave plate 35, and components 36 and 37 which are used to control the precise direction of the beam and to provide compensation for the time of flight of the laser beam to the scene and back. This light is reflected off component 38 which is formed with its two reflecting surfaces which are not quite parallel to each other. Radiation reflected from its front surface forms the local oscillator beam of the interferometer and, via a semireflecting mirror 39, interferes with the return beam to produce a heterodyne beat signal which is fed to a heterodyne detector 40. This heterodyne signal does not include a frequency component due to the carrier frequency of the laser (typically many Gigahertz) but can have a bandwidth of up to 100 MHz. The frequency modulation of the transmitter laser light is 40 MHz, which results in a heterodyne frequency bandwidth of 80 MHz, the range of the objects of which reflect the light giving an asymetrical frequency shift which is related to the phase delay of the reflected light as compared with the reference light, Additionally, a bandwidth of 20 MHz is allowed to accommodate Doppler frequency shifts which are indicative of the velocity of objects moving towards or away from the source of light. The laser light which is passed by the beam splitter 10 towards the beam separator 12 is itself plane polarised with the electric vector in the plane of the paper. The position of the beam separator 12 is arranged so that the light is incident at the Brewster angle. Thus incident light is wholely transmitted towards the scanner 6. Inside the telescope 1 is a suitably orientated quarter wave plate, not shown, which converts the outgoing radiation to circular polarisation. When this radiation is reflected from the scene, it will still be circularly polarised, but in the opposite sense so that on passing through the quarter wave plate in the telescope 1 it will become plane polarised once more but with the electric vector perpendicular to the paper. Thus on reaching the beam separator 12 most of the returned light will be reflected into the interferometer 11 along path 14.

As previously mentioned, reflector 38 is made so that its front and rear surfaces are not quite parallel. Radiation reflected from the front surface represents the local oscillator beam, and combines at mirror 39 with the returned beam to produce the heterodyne signal from which the velocity of objects in the field of view can be determined at the heterodyne detector 40. Radiation from the rear surface of the reflector 38 is inclined to the local oscillator beam and is focussed by a lens system 41, 42, 43 on to a separate detector (not shown) which provides a signal for monitoring the laser beam intensity and frequency.

As previously mentioned the heterodyne signal obtained at the heterodyne detector 40 contains a frequency component which is dependent upon the range and velocity of the scene. The frequency of the heterodyne signal is a sinusoidal signal in which the phase relative to the transmitted signal is dependent upon range and the average frequency is dependent upon the velocity. The relative phase is manifest as a non-symetrical distribution of sideband signals with respect to the originally transmitted frequency of modulation of the laser light, and can be readily identified. Thus the velocity and range for each pixel can be extracted from the signal output by the heterodyne detector 40 by sampling the profile of the heterodyne signal to extract the different frequency component. In fact, these signals are generated by the signal processor 16 and passed to the appropriate scene of the display 17. The laser frequency of deviation of 40 MHz is chosen with regard to the maximum range and the maximum velocity of distant objects which need to be measured. The frequency modulation has a sinusoidal law which has a periodicity corresponding to a frequency of ~30 kHz which is chosen to correspond with the resolution of an individual pixel. Thus each field of view is notionally divided into a two-dimensional array of pixels having 96 pixels to a line scan, and 64 separate line scans. The sinusoidal envelope of the frequency modulation is synchronised with the start of each line scan, as this facilitates the extraction of data relating to range and velocity for each pixel.

The beam splitter 13 serves to separate the received radiation into two parts. Radiation at and very close to the wavelength of the laser light will be transmitted and passed to the interferometer 11 whilst the rest of the thermal band is reflected via a mirror 44 and focussing elements 45, 46, 47 to the thermal detector 15.

The output of the thermal detector 15 is passed to the signal processor 16 where it is combined with the optical signals in a manner which permits the thermal content of the scene 2 to be displayed on one of the four screens of the display unit 17 in a compatible format so as to permit visual identification of objects appearing on all four screens, each of which represents the same two-dimensional field of view.

The invention claimed is:

1. An imaging arrangement including: a scanning device for sequentially viewing different elements of a scene; thermal sensing means coupled to said scanning device for forming a two-dimensional image of scene-emitted thermal radiation; an optical source arranged to generate a frequency modulated laser beam for illuminating the scene via the scanning device; optical sensing means coupled to said scanning device for extracting data from the light reflected by the scene in response to the illumination by said optical source; and narrow band filter means for separating laser light reflected from the scene from thermal radiation emitted by the scene, said narrow band filter means being positioned between the optical source and the scanning device and being a partially transmitting, partially reflecting device.

2. An imaging arrangement including: a scanning device for sequentially viewing different elements of a scene; an optical source arranged to generate a frequency modulated laser beam for illuminating a scene via the scanning device; a narrow band filter means disposed in the beam path between said source and said scanning device for passing radiation of the wavelength of said source and for reflecting thermal radiation emitted by the scene and received via said scanning device; thermal sensing means, coupled to said scanning device via said filter means, for receiving the radiation reflected by said filter means and for forming a two-dimensional image of the scene-emitted thermal radiation; and optical sensing means coupled to said scanning device for extracting data from the light reflected by the scene in response to the illumination by said optical source, said optical sensing means including an optical interferometer operative at the wavelengths of the optical source for receiving light directly from said source and for receiving via said scanning device, laser light reflected by the scene.

3. An arrangement as claimed in claim 1 wherein the scanning device includes a continuously rotatable polygon faced mirror in combination with a steppable inclined mirror.

4. An arrangement as claimed in claim 3 and wherein said laser is operative to produce a narrow beam which is incident upon the rotatable polygon faced mirror and the steppable mirror so as to scan the scene in a two-dimensional raster pattern.

5. An arrangement as claimed in claim 1 wherein said optical sensing means is operative to produce a two-dimensional image of the laser light reflected by said scene so as to be compatible with said two-dimensional image of the emitted thermal radiation.

6. An arrangement as claimed in claim 5 and wherein additional two-dimensional images are derived from the light reflected by the scene and which are indicative of the range and/or line-of-sight velocity of objects within the scene.

7. An arrangement as claimed in claim 2 and wherein the interferometer is operative to produce an output signal from which the range of objects within the scene can be determined.

8. An arrangement as claimed in claim 7 and wherein the interferometer is operative to produce an output signal from which the line-of-sight velocity of objects moving within the scene can be determined.

9. An imaging arrangement as claimed in claim 1 wherein said narrow band filter means is a dichroic beam splitter for passing the wavelengths of said source to said optical sensing means and for reflecting thermal radiation to said thermal sensing means.

* * * * *